United States Patent [19]

Altmeppen

[11] 3,717,383
[45] Feb. 20, 1973

[54] BRAKE CONTROL APPARATUS

[75] Inventor: Johannes Altmeppen, Empelde, Germany

[73] Assignee: Westinghouse Bremsen-Und Apparatebau GmbH, Hanover, Germany

[22] Filed: Dec. 16, 1970

[21] Appl. No.: 98,601

[52] U.S. Cl. .................................................. 303/10
[51] Int. Cl. ............................................... B25b 1/20
[58] Field of Search ........................... 303/50, 54, 10

[56] References Cited

UNITED STATES PATENTS

| | | | |
|---|---|---|---|
| 2,992,046 | 7/1961 | Mortimer et al. | 303/54 |
| 2,159,610 | 5/1939 | West | 303/54 X |

Primary Examiner—Evon C. Blunk
Assistant Examiner—Douglas D. Watts
Attorney—Ralph W. McIntire, Jr.

[57] ABSTRACT

The invention relates to an activating system for a hydraulic servo brake installation for use with motor vehicles, particularly trucks, tractors, farm machinery, and the like, equipped with a brake valve located in the main brake line between a pressure source and the brake cylinders, and with a return pipe connected in series with the brake valve and branching off from the main brake line.

4 Claims, 1 Drawing Figure

PATENTED FEB 20 1973
3,717,383
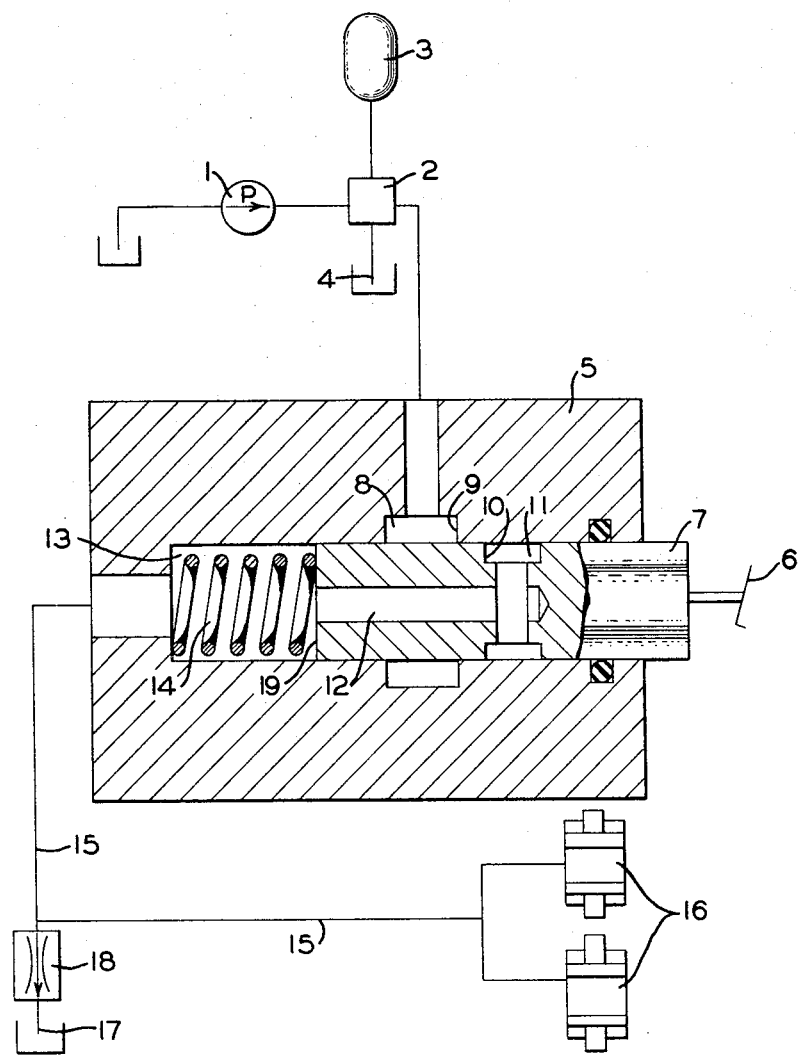
INVENTOR
JOHANNES ALTMEPPEN
BY Ralph W. McIntire, Jr.
ATTORNEY

BRAKE CONTROL APPARATUS

The invention has for its object that of creating a highly sensitive, controllable hydraulic servo brake.

According to the present invention, a brake valve is provided with a control piston that has a central passageway therein that at one end opens at the surface of the bottom of a peripheral annular groove formed on the piston intermediate its ends and at the opposite end opens at one end of the piston. As an increasing amount of the groove is moved into registry with an end of a supply passageway opening at the wall surface of a bore in which the piston is manually movable, a variable supply of a hydraulic medium is supplied to a brake cylinder and to the inlet of a variable area choke of the type that provides a constant quantity of hydraulic medium discharged from its outlet. The outlet of this choke is connected to a return line leading to the sump of a hydraulic pump that supplies the hydraulic medium.

Manual operation of a brake valve having this construction provides simultaneously a constant quantity of hydraulic medium returned to the sump via the choke and a buildup of pressure in a brake cylinder, it being noted that as movement of the control piston increases, the size of the supply valve opening likewise increases to correspondingly cause a decrease in the pressure in the supply passageway and the storage tank connected thereto. Thus, a graduated brake application can be effected with a high degree of sensitivity and the degree of brake cylinder pressure obtained adjusted to rapidly changing conditions.

In a refinement of this system, the brake valve possesses a cylinder chamber, into which flows a brake fluid via the groove and passageway in the control piston. In this particular arrangement, the braking pressure in the brake cylinders is also exerted upon the control area at the one end of the control piston of the brake valve, so that a reactive force corresponding to that of the braking force finds its way back to the brake pedal.

The invention will now be explained in further detail, by means of an illustrative example shown in the single FIGURE of the drawing comprising a schematic diagram of the actuating system of a servo brake.

The diagram shows a booster pump 1 which provides a constant pressure across a reversing valve mechanism 2 to a storage tank 3, in a manner which will not be further described here, and also, when a predetermined pressure is reached, exerts this pressure on the return line 4. The reversing valve 2 is further connected to a brake valve 5, designed to act as a pressure control valve, which contains a control piston 7 which can be displaced by a foot-operated brake pedal 6. The brake valve 5 also possesses an internal annular groove 8 which can be traversed by the control piston 7, the leading edge 9 of this groove 8, when in communication with a leading edge 10 of a peripheral annular groove 11 located in the control piston 7, providing for flow of hydraulic medium to a cylinder chamber 13 via a drilled hole 12 in the piston 7 and the annular groove 11 the control piston 7 being slidably mounted in the chamber 13 in which a spring 14 is interposed between the control piston 7 and the left-hand end of this chamber. The cylinder chamber 13 is connected, by way of brake line 15, to the brake cylinders 16. From the brake line 15 a return line 17 branches off, into which a variable area choke 18 is inserted. The construction of this choke 18 is such that in operation its crosssectional area is decreased as the pressure of the hydraulic medium in the brake line 15 is increased so that a constant quantity of hydraulic medium is always discharged from its outlet into the return line 17 notwithstanding an increase in the pressure of the hydraulic medium present in the brake line 15.

The mode of operation of the brake actuation system is as follows:

When the brake pedal 6 is actuated, the control piston 7 is pushed into the cylinder chamber 13 against the force of spring 14, to open a supply passageway the size of which is determined by the relative positions of the leading edges 9 and 10 of the annular grooves 8 and 11, which releases a flow of brake fluid to the brake cylinders 16 and across the choke 18 into the return line 17, creating a pressure drop in the storage pressure exerted in the internal annular groove 8. The brake cylinder pressure caused by the difference between the storage tank pressure and the pressure drop, which is dependent on the force with which the brake pedal 6 is actuated, simultaneously acts on the front surface or end 19 of the control piston 7 in the cylinder chamber 13 and creates a back pressure that opposes the force on the brake pedal. Since a constant amount of the brake fluid always flows back across the choke 18 into the return line 17 during the actuation of the brake, a very slight change in the force exerted on the brake pedal 6 causes an immediate raising or lowering of the controlled brake cylinder pressure. This makes possible a highly sensitive regulation of brake cylinder pressure that can be adjusted to the conditions of the moment.

Having now described the invention, what I claim as new and desire to secure by Letters Patent, is:

1. A manually-controlled power-operated hydraulic brake apparatus for a vehicle comprising, in combination:
   a. fluid pressure-operated braking means for effecting a brake application on the vehicle,
   b. a manually-operated brake valve for supplying fluid under pressure to said braking means, said brake valve comprising:
      i. a single movable control piston having thereon a peripheral annular groove and therein a passageway opening at one end at the surface of the bottom of said groove and at the other end at one end of said piston, and
      ii. manual means for moving said piston in the direction to open a fluid pressure communication through which a hydraulic medium may flow to said braking means via said groove and passageway, said one end of said piston being subject to pressure of the hydraulic medium supplied via said passageway to establish a fluid pressure force acting in opposition to the force established by said manual means, and
   c. variable area choke means disposed in said fluid pressure communication for reducing the pressure in said braking means to a value less than that established by operation of said manually-operated brake valve.

2. A manually-controlled power-operated hydraulic brake apparatus, as recited in claim 1, further characterized in that said variable area choke means is so constructed as to provide a constant quantity of hydraulic medium discharged from its outlet notwithstanding an increase in the pressure of the hydraulic medium supplied to its inlet.

3. A manually-controlled power-operated hydraulic brake system, as recited in claim 1, further characterized in that as the area of said variable area choke is increased the pressure established in said braking means is decreased.

4. A manually-controlled power-operated hydraulic brake system, as recited in claim 1, further characterized by a power-driven pump for establishing said source of hydraulic medium under pressure, the maximum output of said pump exceeding the maximum flow capacity of said variable area choke thereby insuring the establishment of a chosen pressure in said braking means notwithstanding an undesired change in the area of said variable area choke from a minimum to a maximum value.

* * * * *